(12) United States Patent
Ito et al.

(10) Patent No.: US 8,911,839 B2
(45) Date of Patent: Dec. 16, 2014

(54) HEAT SHRINKABLE POLYESTER FILM

(75) Inventors: Hideki Ito, Inuyama (JP); Masakazu Iwasaki, Inuyama (JP)

(73) Assignee: Toyo Boseki Kabushiki Kaisha, Osaka (JP)

(*) Notice: Subject to any disclaimer, the term of this patent is extended or adjusted under 35 U.S.C. 154(b) by 419 days.

(21) Appl. No.: 13/057,685

(22) PCT Filed: Aug. 7, 2009

(86) PCT No.: PCT/JP2009/063991
§ 371 (c)(1),
(2), (4) Date: Feb. 4, 2011

(87) PCT Pub. No.: WO2010/016563
PCT Pub. Date: Feb. 11, 2010

(65) Prior Publication Data
US 2011/0143123 A1  Jun. 16, 2011

(30) Foreign Application Priority Data

Aug. 8, 2008  (JP) ................................. 2008-205169
Aug. 6, 2009  (JP) ................................. 2009-183241

(51) Int. Cl.
| B32B 27/06 | (2006.01) |
| B32B 27/08 | (2006.01) |
| B32B 27/18 | (2006.01) |
| B32B 27/20 | (2006.01) |
| B32B 27/36 | (2006.01) |
| G09F 3/04 | (2006.01) |
| C08J 5/18 | (2006.01) |
| C08J 7/04 | (2006.01) |
| C08J 7/06 | (2006.01) |
| B32B 37/24 | (2006.01) |

(52) U.S. Cl.
CPC . *G09F 3/04* (2013.01); *B32B 27/18* (2013.01); *B32B 27/36* (2013.01); *B32B 2037/243* (2013.01); *B32B 2307/21* (2013.01); *B32B 2307/406* (2013.01); *B32B 2307/412* (2013.01); *B32B 2307/736* (2013.01); *C08J 5/18* (2013.01); *C08J 7/047* (2013.01); *C08J 7/06* (2013.01); *C08J 2367/02* (2013.01); *C08J 2467/00* (2013.01)
USPC ........... 428/34.9; 428/323; 428/331; 428/480

(58) Field of Classification Search
None
See application file for complete search history.

(56) References Cited

U.S. PATENT DOCUMENTS

| 663,928 | A | * | 12/1900 | Pratt | ............................. 474/57 |
| 4,020,141 | A | * | 4/1977 | Quinn et al. | ................. 264/466 |
| 4,605,591 | A | * | 8/1986 | Nose et al. | ................. 428/332 |
| 4,996,291 | A | * | 2/1991 | Yoshinaka et al. | ............. 528/272 |
| 6,194,061 | B1 | * | 2/2001 | Satoh et al. | ................... 428/341 |
| 6,291,053 | B1 | * | 9/2001 | Peiffer et al. | ................. 428/141 |
| 6,447,925 | B1 | * | 9/2002 | Tabota et al. | ................. 428/480 |
| 6,513,656 | B2 | * | 2/2003 | Hanaoka et al. | ............. 206/497 |
| 6,528,144 | B2 | * | 3/2003 | Peiffer et al. | ................. 428/141 |
| 6,663,928 | B2 | * | 12/2003 | Ito et al. | ....................... 428/35.1 |
| 6,699,549 | B1 | * | 3/2004 | Ueyama et al. | ............. 428/36.7 |
| 6,841,254 | B2 | * | 1/2005 | Okajima et al. | ............ 428/423.7 |
| 6,939,584 | B2 | * | 9/2005 | Sankey et al. | ............. 427/393.5 |
| 7,211,306 | B2 | * | 5/2007 | Peiffer et | ..................... 428/34.9 |
| 7,638,203 | B2 | * | 12/2009 | Inagaki et al. | ................ 428/480 |
| 7,960,028 | B2 | * | 6/2011 | Inagaki et al. | ............. 428/423.7 |
| 8,206,797 | B2 | * | 6/2012 | Haruta et al. | ................ 428/35.1 |
| 2002/0065346 | A1 | | 5/2002 | Murschall et al. | |
| 2002/0150780 | A1 | * | 10/2002 | Ito et al. | ....................... 428/480 |
| 2006/0063008 | A1 | | 3/2006 | Inagaki et al. | |
| 2007/0071967 | A1 | | 3/2007 | Inagaki et al. | |
| 2009/0127741 | A1 | * | 5/2009 | Kurouji et al. | ................ 264/291 |
| 2010/0260951 | A1 | * | 10/2010 | Haruta et al. | ................ 428/35.1 |

FOREIGN PATENT DOCUMENTS

| CN | 1894101 A | | 1/2007 |
| CN | 101155689 A | | 4/2008 |
| JP | 03-203936 | * | 9/1991 |
| JP | 2001-055456 | * | 2/2001 |
| JP | 2005-139358 | * | 6/2005 |
| JP | 2005-254524 A | | 9/2005 |
| JP | 2005-335111 A | | 12/2005 |
| JP | 2005-335368 A | | 12/2005 |
| JP | 2006-095710 A | | 4/2006 |
| JP | 2006-181897 A | | 7/2006 |
| JP | 2006-265465 A | | 10/2006 |
| JP | 2007-031584 A | | 2/2007 |
| JP | 2007-169323 A | | 7/2007 |
| JP | 2007-293212 A | | 11/2007 |
| JP | 2008-001050 | * | 1/2008 |

(Continued)

OTHER PUBLICATIONS

Japanese Patent Office, International Search Report in International Patent Application No. PCT/JP2009/063991 (Oct. 13, 2009).
Japanese Patent Office, International Written Opinion in International Patent Application No. PCT/JP2009/063991 (Oct. 13, 2009).

(Continued)

*Primary Examiner* — Vivian Chen
(74) *Attorney, Agent, or Firm* — Leydig, Voit & Mayer, Ltd.

(57) ABSTRACT

Disclosed is a heat shrinkable polyester multilayer film having excellent transparency, gloss and workability, which can be produced easily. Specifically disclosed is a heat shrinkable polyester film having a haze value of not more than 2%, a glossiness at a measurement angle of 45° of not less than 200% in at least one side of the film, and a dynamic coefficient friction between one side of the film and the other side of the film of not more than 1.5. The heat shrinkable polyester film also has a shrinkage in the main shrinking direction of not less than 50% when immersed in hot water of 95° C. for 10 seconds and a surface resistivity of not more than 13 log Ω at a relative humidity of 65%.

5 Claims, No Drawings

(56) References Cited

FOREIGN PATENT DOCUMENTS

| | | | |
|---|---|---|---|
| JP | 2008-001050 A | | 1/2008 |
| JP | 2008-030371 A | | 2/2008 |
| JP | 2008-031345 A | | 2/2008 |
| WO | WO 2005/056292 | * | 6/2005 |
| WO | WO 2006/132244 A1 | | 12/2006 |

OTHER PUBLICATIONS

Japanese Patent Office, Office Action in Japanese Patent Application No. 2009-183241 (Dec. 10, 2009).

European Patent Office, Extended European Search Report in European Patent Application No. 09805045.3 (Aug. 20, 2012).

Chinese Patent Office, First Office Action in Chinese Patent Application No. 2009-80130601.1 (Jul. 2, 2012).

Korean Patent Office, Notice of Preliminary Rejection in Korean Patent Application No. 10-2011-7005027 (Jul. 26, 2012).

European Patent Office, Communication Pursuant to Article 94(3) EPC in European Patent Application No. 09 805 045.3 (Aug. 28, 2013).

Japanese Patent Office, Notice of Reasons for Rejection in Japanese Patent Application No. 2010-025236 (Sep. 4, 2012).

* cited by examiner

HEAT SHRINKABLE POLYESTER FILM

TECHNICAL FIELD

The invention relates to a heat shrinkable polyester film and more particularly a heat shrinkable polyester excellent in transparency and gloss.

BACKGROUND ART

Recently, heat-shrinkable plastic films have widely been used aiming at wrapping of packaged articles for improvement in appearance, at packaging for avoiding direct impact of contents, and at label package serving as protection of glass bottles or plastic bottles and display of articles. In plastic materials used for these purposes, are drawn films, such as polyvinyl chloride films, polystyrene films, and the films are used for labels, cap seals, or integrated packaging, for various containers, such as polyethyleneterephthalate (PET) containers, polyethylene containers, and glassware.

However, on one hand, polyvinyl chloride films have outstanding shrink characteristics, but have low heat-resisting property. Furthermore, it has problems of generation of hydrogen chloride gas or dioxins in incineration. In addition, use as shrink labels of heat-shrinkable vinyl chloride resin films for, such as PET containers, causes a problem of needing separation of the labels from the containers, in recycling use of the containers.

On the other hand, a polystyrene film can be evaluated in terms of good finishing appearance after shrinkage; however it is inferior in solvent resistance and therefore requires use of an ink with a special composition at the time of printing. Further, recently, a heat shrinkable film has been employed for PET bottle labels for hot beverages; however with respect to a heat shrinkable polystyrene film, in the case of storage in warming equipments such as hot warmers, there is a problem that the shrinkage label is at once melted when being brought into contact with a high temperature hot wire or the like. Further, a polystyrene resin has to be incinerated at a high temperature and has a problem that a large quantity of black smoke and malodor are generated at the time of incineration.

A polyester film free from these problems (excellent solvent resistance, excellent heat resistance, and excellent environmental aptitude) has been used as a shrinkable film alternative to a polyvinylchloride film and a polystyrene film.

In production of labels etc., following methods are usually adopted. That is, raw material polyester is continuously extruded in a molten state. An undrawn film is manufactured. Subsequently, the undrawn film is drawn and wound to give a heat-shrinkable polyester film roll. The film in the roll is then unwound and slit into a film with a desired width, the slit film being rewound into another roll. Subsequently, various information and figures such as product name etc. are printed on the resulting film. After printing, the film is folded and bonded along both edges by means of, for example, solvent adhesion, to give a tubular film (in tubing process). Meanwhile, there may be cases where the printing and the slitting processes are performed in a reversed sequence. The tubular film thus obtained may be cut into tubular labels with a desired length, being further converted into bags by bonding along an edge of openings thereof (for example, patent document 1).

Subsequently, containers wrapped in the labels or the bags above are passed, for example on a belt conveyer, through a shrinking tunnel (a steam tunnel) wherein heated steam is blown in for heat shrinking or a hot-air tunnel wherein hot air is blown in, to give final products (labeled containers) having the labels or the bags tightly attached thereon.

One of important properties which are required as a film to be used for container's labels is transparency. As described above, in many cases, letter information and designs of various kinds of product names or the like are printed on the film to be used for container's labels and in the case of a transparent label, printing is done in the side of the film which is contact with the container and if the transparency is low, it becomes impossible to print clear printing patterns. Moreover, in unprinted portions, there is a problem that it is difficult to confirm the color and packed amount of the content such as a beverage in the transparent container.

Furthermore, one of characteristics of a polyester film among shrinkable label materials is excellent gloss, and if the gloss is low, it may lead to an adverse effect on commercial product images, for example, an effect to diminish high grade impression of coated commercial products.

As a method for processing a shrinkable film, there is a case that a metal vapor deposition process is carried out on a label to provide metallic appearance. The process is often carried out in the side which is contact with a container, and in the case of a film with inferior transparency and gloss described above, it is difficult to give appearance of the covered container surface to be like a metal surface.

As described above, improvement of transparency and gloss for a film for shrinkable labels is important for expectation of an effect to improve the designs and commercial product images. The invention aims to further improve transparency and gloss of an existing heat shrinkable polyester film.

Further, since a conventionally known polyester film is an insulator, the film has a problem that static electricity is easy to be generated and accumulated. For example, static electricity causes winding of the film on a roll and electric shock on a human body in the film production process, printing on the film, or bonding films to each other, and thus it makes handling of the film complicated. Further, static electricity becomes a cause of so-called printing beard and stains on the film surface and may possibly lower the commercial product value. Consequently, it is desired to provide a polyester film with suppressed static electricity generation and accumulation.

Patent document 1: Japanese Patent Laid-Open No. 2005-335111

DISCLOSURE OF THE INVENTION

Problem to be Solved by the Invention

The invention aims to provide a heat shrinkable polyester laminated film excellent in transparency, gloss, and processability and easy to be produced.

Means for Solving the Problem

This invention is composed the following constitution.

1. A heat shrinkable polyester film having a haze value of 2% or less, a glossiness of 200% or more at a measurement angle of 45° for at least one face, a dynamic friction coefficient between one face and the other face of 1.5 or less, a shrinkage ratio of 50% or more in the main shrinkage direction when the film is immersed in hot water at 90° C. for 10 seconds, and a surface resistivity of 13 log Ω or less at a relative humidity of 65%.

2. The heat shrinkable polyester film according to claim 1, wherein a haze value is 3% or less and a glossiness is 190% or more at a measurement angle of 45° for at least one face of the film after the film is shrunk by 10% in the main shrinkage direction by immersing the film in hot water at 95° C. for 10 seconds.

3. The heat shrinkable polyester film according to claim 1 or 2 having a solvent adhesion strength of 2 N/15 mm or more.

4. The heat shrinkable polyester film according to any one of claims 1 to 3, being a laminated film having a base film of a polyester resin and a surface layer formed on at least one face of the base film.

5. The heat shrinkable polyester film according to claim 4, wherein the surface layer has a solid content amount in a range of 0.0005 g/m² or more and 0.1 g/m² or less.

6. The heat shrinkable polyester film according to claim 4 or 5, wherein the surface layer contains inorganic particles with a particle diameter of 1 nm or more and 300 nm or less.

7. The heat shrinkable polyester film according to any one of claims 4 to 6, wherein the surface layer contains inorganic particles and an anionic antistatic agent.

8. The heat shrinkable polyester film according to any one of claims 4 to 7, wherein the surface layer contains a polyester and/or a polyester derivative.

EFFECT OF THE INVENTION

According to the invention, a heat shrinkable polyester laminated film excellent in transparency, gloss, and processability can be provided economically.

MODE FOR CARRYING OUT THE INVENTION

Hereinafter, embodiments of a heat shrinkable polyester laminated film and its production method of the invention will be described.

A heat shrinkable polyester film of the present invention has a surface layer on a surface of a polyester film base layer.

[Base Layer]

A heat shrinkable polyester film is obtained using a single copolymerized polyester having ester units formed from publicly known polybasic carboxylic acid components and polyhydric alcohol components as a principal constitution unit, or a mixture of two or more polyesters, and the film cut into a shape of a square measuring 10 cm×10 cm has a shrinkage ratio of not less than 50% in a maximum shrinkage direction, when the film is immersed in hot water at 95° C. for 10 seconds.

Shrinkage ratio (%)=(size before heating−size after heating)/size before heating×100

Unsatisfactory heat shrinkage ratio of the film of less than 50% does not allow close contact of the film to containers, and disadvantageously generates defect appearance, when the film is made to wrap the containers and subsequently made to shrink. A more preferable heat shrinkage ratio is not less than 52%, and a still more preferable heat shrinkage ratio is not less than 55%. However, if the heat shrinkage ratio of a film is too large, the film will become to easily generate unevenness in the shrinkage processing, the heat shrinkage ratio may be 100% or lower, even if 90% or lower.

The heat shrinkable polyester film will, hereinafter, be described in detail. As dicarboxylic acid component that constitutes the polyester in a raw material composition used for a heat shrinkable polyester film of the present invention, there may be used terephthalic acid that constitutes an ethylene terephthalate unit, aromatic dicarboxylic acids and alicyclic dicarboxylic acids.

The aromatic dicarboxylic acids include benzenecarboxylic acids, such as isophthalic acid, orthophthalic acid, 5-tert-butyl isophthalic acid, and 5-sodium sulfoisophtharate; naphthalene dicarboxylic acids, such as 2,6-naphthalene dicarboxylic acid; dicarboxy biphenyls, such as 4,4'-dicarboxy diphenyl, 2,2,6,6-tetramethyl biphenyl-4,4'-dicarboxylic acid; 1,1,3-trimethyl-3-phenyl indene-4,5-dicarboxylic acid and derivatives thereof; 1,2-diphenoxyethane-4,4'-dicarboxylic acid and derivatives thereof etc.

Aliphatic carboxylic acids include oxalic acid, malonic acid, succinic acid, glutaric acid, adipic acid, azelaic acid, sebacic acid, pimelic acid, suberic acid, undecanoic acid, dodecanedicarboxylic acid, brassylic acid, tetradecane dicarboxylic acid, thapsic acid, nonadecanedicarboxylic acid, docosanedicarboxylic acid, and derivatives thereof, 4,4'-dicarboxy cyclohexane, and derivatives thereof etc.

Diol components of the polyesters in a raw material composition include any of aliphatic diols, alicyclic diols, and aromatic diols, in addition to ethylene glycol that constitutes the polyethylene terephthalate unit.

Aliphatic diols include diethylene glycol, propylene glycol, butanediol, 1,6-hexandiol, 1,10-decanediol, neopentylglycol, 2-methyl-2-ethyl-1,3-propanediol, 2-diethyl-1,3-propanediol, 2-ethyl-2-n-butyl-1,3-propanediol etc. Alicyclicdiols include 1,3-cyclohexane dimethanol, 1,4-cyclohexane dimethanol etc. Aromaticdiols include ethyleneoxide addition product of bisphenol compounds, such as 2,2-bis(4H(3-hydroxyethoxy phenyl)sulfone; xylylene glycol etc. In addition, polyalkylene glycols, such as polyethylene glycols and polypropylene glycols may also be used as diol components.

Polyesters included in the raw material composition may be obtained from the acid components and diol components. In preparation of the polyesters, one or more kinds of acid components or diol components are preferably used in combination in order to improve properties as heat shrinkable films, and kinds and contents of monomer components to be used in combination are suitably determined based on desired film properties, economical efficiency, etc. The raw material composition includes one or more kinds of polyesters. When one polyester is to be included, the polyester is a copolymerized polyester containing ethylene terephthalate unit. In use of a polyester as a combination of two or more kinds of polyesters, the polyester is a mixture of a copolymerized polyester and a homopolyester having a desired composition. Since copolymerized polyesters have a lower melting point and generally has problems, such as difficulty in handling at the time of drying, they are preferably used in a mixed state of homopolyesters (polyethylene terephthalate, polyethylenenaphthalate, poly(1,4-cyclohexene diethylene terephthalate), etc.) and copolymerized polyesters. However, in order to obtain a heat shrinkable polyester film, 1 to 2 mol % of whole of the polyester may be aliphatic dicarboxylic acid unit. Control of this composition within the limit allows control of starting temperature of heat shrink in a preferable range.

Each of the polyesters in the raw material composition may be manufactured by conventional methods. The polyester may be prepared using, for example, a direct esterification method carrying out a direct reaction of dicarboxylic acids and diols, an ester interchange method carrying out reaction between dicarboxylic acid dimethyl esters and diols etc. Preparation may be performed by either method of a batch process and a continuous process.

In the raw material composition, if necessary, various kinds of known additives may be added besides the above-mentioned polyesters. Examples of the additives are inorganic inert particles such as silica, calcium carbonate, kaolinite, alumina, talc, and barium sulfate; and organic inert particles of benzoguanamine resins, polystyrene resins, etc., all having a particle diameter of 0.001 to 10 μm, and addition of these additives improves a slipping property and blocking resistance. However, addition of these particulate additives may become causes of problems of worsening the transparency by scattering light outside and inside of a film and of lowering gloss by coarsening the film surface and causing diffused reflection, and therefore, it is has to be carefully consider the shape and addition amount.

Additionally, examples of the additives are antistatic agents; anti-aging agents; ultraviolet absorbents; coloring agents; and dyes.

The haze value of the film is preferably 2% or less. It is more preferably 1.5% or less. In the case the haze value of the film exceeds 2%, the degree of transparency is insufficient and appearance quality is hard to be satisfactory and therefore it is not preferable. The haze value is more preferable as it is lower; however it may be sufficient to be 0.1% or more.

With respect to at least one face of the film, it is preferable to have glossiness of 200% or more at a measurement angle of 45°. It is more preferably 210% or more. If it is less than 200%, it becomes difficult to give a high grade impression to covered commercial products and therefore, it is not so preferable. However, if the glossiness is made too high, printed patterns and letters become rather difficult to be seen due to light reflection and for that, it may be 300% or less.

The surface resistivity of the film at a relative humidity of 65% is preferably 13 log Ω or less. It is further preferably 11.5 or less. If the surface resistivity at a relative humidity of 65% exceeds 13 log Ω, the handling property is worsened in respective steps and besides that, commercial product value may possibly be lowered due to electrostatic stains and it is not preferable. However, if the surface resistivity is made too low, a problem that transfer stains of an antistatic agent become remarkable may be possibly caused and for that, the surface resistivity may be 8 log Ω or more.

The heat shrinkable polyester film of the invention can be suitably used for uses as labels of bottles and is preferable to have a preferable low haze value and high glossiness even after being subjected to heat shrinkage attaching process. That is, the haze value of the film which is immersed in hot water at 90° C. for 10 seconds and shrunk by 10% in the main shrinkage direction is preferably 3% or less and the glossiness of the film subjected to the treatment in the same condition is preferably 190% or more.

If the haze value of the film which is immersed in hot water at 90° C. for 10 seconds and shrunk by 10% in the main shrinkage direction exceeds 3%, the degree of transparency of the label after heat shrinkage attaching process becomes insufficient and therefore, it is not so preferable. It is more preferably 2% or less. The haze value of the film which is immersed in hot water at 90° C. for 10 seconds and shrunk by 10% in the main shrinkage direction is more preferable as it is lower; however it may be 0.2% or more.

If the glossiness of the film which is immersed in hot water at 90° C. for 10 seconds and shrunk by 10% in the main shrinkage direction is less than 190%, the glossiness of the label after heat shrinkage attaching process becomes insufficient and therefore, it is not so preferable. It is more preferably 195% or more. However, if the glossiness of the film which is immersed in hot water at 90° C. for 10 seconds and shrunk by 10% in the main shrinkage direction is tried to be high to an excess extent, printed patterns and letters become rather difficult to be seen due to light reflection and for that, it may be 300% or less.

The heat shrinkable polyester film of the invention is preferably a laminated film having a base film of a polyester resin and a surface layer formed on at least one face of the base film. The solid content of the surface layer is 0.0005 g/m² or more and 0.1 g/m² or less. If it is less than 0.0005 g/m², the slipping property of the film become insufficient and therefore, it is not so preferable. On the other hand, if it exceeds 0.1 g/m², transparency is inhibited and therefore, it is not so preferable. The lower limit is more preferably 0.0008 g/m² or more and further more preferably 0.001 g/m² or more. The upper limit is more preferably 0.09 g/m² or less and particularly preferably 0.085 g/m² or less.

The dynamic friction coefficient between one face and the other face of the film is preferably 1.5 or less. It is more preferably 1.2 or less. If it exceeds 1.5, wrinkle- and acne-like defects upon rolling tend to be formed and therefore, it is not so preferable. However, if the dynamic friction coefficient is too low, the end face may possibly become uneven at the time of rolling and therefore, it may be 0.1 or more.

The solvent adhesion strength of the film is preferably 2 N/15 mm or more. It is more preferably 2.2 N/15 mm or more and particularly preferably 2.4 N/15 mm or more. If the solvent adhesion strength is less than 2 N/15 mm, it results in an undesired consequence such as separation of an adhesion part or the like and therefore, it is not so preferable. However, if the solvent adhesion strength is too high, it may result in an undesirable consequence such as deformation of the adhesion part and blocking of the label inner face due to penetration with an adhesive solvent and therefore, it may be 10 N/15 mm or less.

The raw material composition is molded into a shape of a film by publicly known methods (for example, an extrusion method, a calendering method). The shape of the film may, for example, be planar, or tubular, and it is not limited in particular. As drawing methods, for example, publicly known methods, such as a roll drawing method, a long gap drawing method, a tenter drawing method, and a tubular drawing method, may be employed. In any case where these methods are used, drawing may be performed using a sequential biaxial drawing, a concurrent biaxial drawing, a uniaxial drawing, and combination of the drawing methods. In the biaxial drawing, drawing in vertical and horizontal directions may be performed simultaneously, or drawing in either of directions may beforehand be performed. The draw ratio is suitably set within a range of 1.0 time to 7.0 times, and a ratio in a predetermined direction is preferably set not less than 3.5 times.

In drawing process, preheating is preferably given to a material film at a temperature of not less than a glass transition temperature (Tg) of the polymer constituting the film, and not more than Tg+80° C. In heat setting at the time of drawing, the film preferably is passed within a heating zone having a temperature of 30° C. to 150° C. for approximately 1 to 30 seconds, for example after drawing. In addition, after drawing of the film, the film may be drawn at a predetermined draw ratio before or after heat setting. Furthermore, after the drawing process, there may be performed an additional process for cooling the film under application of stress to the film while maintaining the film under elongated state or stressed state, or subsequently additional cooling process after canceling of stressed state. The thickness of the film obtained is preferably in a range of 6 to 250 μm.

In the invention, a surface layer is preferable to be formed on at least one face of the base layer.

In general, the heat shrinkable polyester film for labels is provided with an easily slipping property which is required in terms of handling of the film by adding a particle lubricant in the base layer and controlling the particle shape and addition amount and distribution. However, since it is needed to keep the transparency and gloss in specified ranges in the invention, addition of the particle lubricant is limited and therefore, the slipping property may become insufficient. In the invention, it has been found possible to obtain a heat shrinkable polyester film which is satisfactory in both aspects of keeping transparency and gloss in specified ranges and of having a slipping property necessary for film productivity and handling convenience by laminating an easily slipping layer containing the particle lubricant on the surface.

It is recommended to add a resin component which has a function as a binder in surface layer components. Examples of the resin component may be polyester resins, polyamide resins, polyurethane resins, epoxy resins, phenol resins, acrylic resins, polyvinylacetate resins, polyolefin resins such as polyethylene and polypropylene and their copolymers and modified resins, and cellulose resins. A resin to be used as a binder in the invention is desirable to be substantially water-insoluble, so that an effect on the easily slipping property by moisture absorption is scarcely caused.

Especially, the resin component having a function as a binder in the surface layer components is preferably polyesters and polyester derivatives and preferably has a hydrophobic copolymerized polyester resin as a trunk polymer. A graft polymerization reaction product obtained by graft polymerization of the polyester resin with a radical polymerizable monomer in an organic solvent and then addition of water and removal of the organic solvent is excellent in adhesive property and water-proofness and moreover in a state of a resin-dispersed-in-water and is therefore preferable in terms of working ambient environments and coatability, and it is also recommended due to scarce inhibition of adhesion of films with a solvent, which is needed at the time of processing labels. Components constituting the polyester resin of the trunk polymer preferably contain a component selected from, as a dicarboxylic acid component, an aromatic dicarboxylic acid such as terephthalic acid, isophthalic acid and 2,6-naphthalenedicarboxylic acid and an aliphatic dicarboxylic acid component such as adipic acid, azelaic acid and sebacic acid and additionally about 0.5 to 10 mol % of a component having a polymerizable unsaturated double bond such as fumaric acid, maleic acid and 2,5-norbornenedicarboxylic acid and, as a glycol component, a component selected from an aliphatic diol such as ethylene glycol, 1,3-propanediol, 1,4-butanediol and neopentyl glycol, and an alicyclic glycol such as 1,4-cyclohexane dimethanol. Further, the graft sites are composed of polymerizable unsaturated monomers and are preferable to contain components selected from fumaric acid, maleic acid, maleic anhydride, acrylic acid, methacrylic acid, etc.

Further, a metal, a metal oxide, an inorganic oxide other than the metal may be vapor-deposited on the surface of the heat shrinkable polyester film of the invention and the laminated surface layer has an effect of improving the adhesion property between the vapor-deposited layer and the film. Particularly, those which contain a water-dispersible thermoplastic polyurethane as a main component which is obtained from a polyester polyol, a diisocyanate and optionally a low molecular weight compound having two or more active hydrogen, in which the polyester polyol is obtained from a dicarboxylic acid containing an aliphatic dicarboxylic acid and a glycol are desirable since they have good adhesion property.

Further, in the invention, a particle lubricant is added to the water-based resin dispersion and examples of the particle lubricant are various kinds of inorganic particles such as whitewash, chalk, heavy calcium carbonate, light calcium carbonate, basic magnesium carbonate, dolomite, special calcium carbonate, kaolin, calcined clay, pyrophyllite, bentonite, sericite, zeolite, nepheline syenite, talc, attapulgite, synthesized aluminum silicate, synthesized calcium silicate, diatomaceous earth, silica stone powder, fine powder silicic acid, dehydrated fine powder silicic acid, aluminum hydroxide, barite, precipitated barium sulfate, natural gypsum, gypsum, calcium sulfite, etc. and inactive particles such as a benzoguanamine resin and a polystyrene resin and in connection with the transparency, gloss, and slipping property, any can be used; however particularly preferable ones are natural and synthetic products of silicic acid. So-called colloidal silica can be particularly preferably used. Those having a particle diameter of 0.001 µm to 0.3 µm are preferable. If one having a particle diameter less than 0.001 µm is used, a large quantity has to be used and it tends to be difficult to exhibit the slipping property. If the particle diameter exceeds 0.3 µm, coarse projects are caused to lead to problems of worsening the smoothness and inhibiting printing processing or label processing suitability. Further, if the particle diameter is large, in a method such as bar coating, clogging occurs at the time of coating to result in undesirable failure of normal coating formation and therefore, it is required to adjust the particle diameter correspondingly to the gap of coating bars. In addition, the particle diameter is a particle diameter measured by Coulter Counter method and the average particle diameter of the particles in the film surface layer will be described below. The addition amount differs depending on the shape and particle diameter and the thickness of the surface layer and is not particularly limited; however it is preferable to be 0.05 to 30% by weight in the surface layer. If it is less than 0.05% by weight, the slipping property becomes insufficient and therefore, blocking between films tends to occur easily and if it exceeds 30% by weight, the transparency and gloss tend to be worsened easily.

It is preferable to use an organic solvent having low boiling point for the coating solution for providing wettability of the solution and drying property after coating. In generally, isopropanol is used for the organic solvent. At the time of preparation, the concentration of isopropyl alcohol is needed to be 56% or less. If the concentration exceeds 56%, agglomeration of inert particles tends to be caused easily and it tends to result in an inconvenient consequence of worsening the slipping property due to dropping of the particles after coating and therefore, it is not preferable.

Further, another characteristic of the film of the invention is that an anionic antistatic agent exists in at least one face of the surface. Generation and accumulation of static electricity can be suppressed if the anionic antistatic agent bleeds from the film inside to the surface by making film raw materials contain the anionic antistatic agent by kneading or the like. However, since the glass transition temperature of a polyester constituting the film is generally high, the anionic antistatic agent is often hard to bleed to the film surface at a normal temperature or about that temperature and sufficient suppression of generation and accumulation of static electricity tends to be difficult. Further, the film formation temperature for producing the film of the invention to be produced by drawing of a resin is relatively high and also the reaction activity of the polar groups which the polyester has is high and therefore, if the antistatic agent is added to the film raw materials, deterioration of the polyester is accelerated at the time of film formation and it sometimes results in deterioration of the physical properties of the film and coloration of the film.

The existence amount of the anionic antistatic agent in the film surface is preferably 0.001 to 0.5 g/m². If the existence amount of the anionic antistatic agent is below the above-mentioned range, the antistatic effect cannot be sufficiently secured. On the other hand, if the existence amount of the anionic antistatic agent is beyond the above-mentioned range, transparency and blocking resistance of the film is sometimes lowered.

The above-mentioned anionic antistatic agent is preferably one which contains an alkyl group and has 10 to 20 carbon atoms. If it is such an antistatic agent, for example, even in the case diffusion and loss occurs due to heat in the film production or secondary processing of the film, the amount of diffusion or the like can be suppressed to be low. On the other hand, if the number of carbon atoms exceeds 20, the antistatic effect of the antistatic agent itself is insufficient in some cases. The anionic antistatic agent is more preferably one which has 12 to 18 carbon atoms.

In the invention, the anionic antistatic agent may be selected from known antistatic agents and preferably selected from sulfuric acid and sulfonic acid derivatives such as higher alcohol sulfates, sulfates of alkylphenol ethylene oxide adducts, alkylsulfonates and alkylallylsulfonates. More concrete examples are alkylsulfonates, alkylbenzenesulfonates, alkyl sulfates, alkyl ethoxysulfates and alkyl phosphoric acid ester salts. Preferable examples of the anionic antistatic agent are dodecyl sulfonate and dodecylbenzene sulfonate.

The antistatic agent often has inferior compatibility with silicic acid particles and it is preferable to adjust a solid content of the antistatic agent in a proper range. The proper range is often affected by the characteristics attributed to the type and amount of the contents of the coating solution and can be determined every time while confirming the effect. For example, in the case of dodecyl sulfonate, if the amount of the solid content reaches 40%, silicic acid particles tend to be agglomerated and thus it is preferable to properly adjust the solid content amount accordingly.

The application amount of the water-based dispersion to the polyester film is preferably 0.005 to 5 g/m$^2$ to the film after biaxial drawing. If it is less than 0.005 g/m$^2$, the force to firmly stick inert particles is weak and the durability is worsened. If application is beyond 5.0 g/m$^2$, the slipping property is worsened.

As a method for forming the surface layer on the base material, generally, a method of coating the base material with a water-based solution may be employed. A method of the coating is not particularly limited; however, the optimum methods may be selected according to the application amount and viscosity of a coating solution to be used. A reverse roll coating method, a roll knife coating method, a die coating method, etc. may be employed.

Although the condition for drying and heat treatment at the time of coating depends on the coating thickness and apparatus condition; however it is preferable that the film is immediately sent to the drawing step in the rectangular direction without setting a drying step and dried in a preheating zone or in a drawing zone in the drawing step. In such a case, drying is carried out generally at about 50 to 250° C. If necessary, before the surface layer formation, the base film may be subjected to a corona discharge treatment, another surface activation treatment or anchor treatment with a known anchor treatment agent.

To produce the film on which the surface layer is formed in the invention, a preferable method is an in-line coating method including steps of applying a coating solution to at least one face of a melt-extruded and undrawn polyester film or a uniaxial polyester film and thereafter biaxially or uniaxially drawing the film.

Hereinafter, a tube processing at the time of using the film obtained in the above-mentioned method as a label will be described. In the case a label is produced from a heat shrinkable polyester film of the invention, tube formation processing is to be carried out, and from a viewpoint that in this case, adhesion is often performed by using a solvent, it is preferable that the label can be adhered in a case that a solvent such as 1,3-dioxolane and tetrahydrofuran is applied to one face of the film, the other face of the film is pressure-bonded to the applied face. In the case the solvent adhesion strength is deficient, at the time of heat shrinkage attaching of the label or at the time of handling of a beverage bottle, separation of the label adhesion part may possibly occur.

EXAMPLES

Hereinafter, the invention will be described in detail with reference to Examples. The film properties obtained in respective Examples were measured and evaluated by the following methods.
(1) Heat Shrinkage Ratio in Maximum Shrinkage Direction The heat shrinkage ratio in the maximum shrinkage direction was measured by cutting each film a square of 10 cm×10 cm along the longitudinal direction and its rectangular direction; thermally shrinking each cut sample by treatment in hot water at 95° C.±0.5° C. for 10 seconds in no load state; immediately after that, immersing each sample in water at 25° C.±0.5° C. for 10 seconds, thereafter measuring the lengths of the sample in the lengthwise and transverse directions; and carrying out calculation according to the following equation. A direction in which the shrinkage ratio is largest was defined to be the maximum shrinkage direction.

Heat shrinkage ratio (%)=100×(length before shrinkage−length after shrinkage)÷(length before shrinkage).

(2) Haze

Haze was measured for according to JIS K 7136 using a haze meter (made by Nihon Seimitsu Company).
(3) Glossiness The glossiness (gloss) was measured at a measurement angle of 45 degrees, by using a gloss meter "VG 2000" (manufactured by Nippon Denshoku Industries Co., Ltd.,) according to JIS Z8741.
(4) Dynamic Friction Coefficient The dynamic friction coefficient μd between one face and the other face of a film was measured according to JIS K-7125 in the condition of 23° C. and 65% RH.
(5) Surface Resistivity Measurement was carried out at application voltage of 100 V in the ambient environment of 23° C. and 65% RH using a surface resistivity measurement device (main body: R8340, sample box: R 12704) manufactured by Advantest Corporation and the read value of the measurement device was defined as the surface resistivity.
(6) Solvent Adhesion Strength A seal was formed by applying 1,3-dioxolane in an amount (5±0.3) g/cm$^2$ in an application width of 5±1 mm to two drawn films with a cotton-tipped applicator and sticking these films to each other. The seal part was cut in 15 mm width in the main drawing direction (main shrinkage direction) and its rectangular direction of the film and the obtained sample was set in a tensile testing machine STM-50 manufacture by Baldwin Inc. and the solvent adhesion strength was measured at a tensile speed of 200 mm/min by a 90° peel test.
Particle Diameter of Particles Contained in Coated Layer A coated face of obtained each film was magnified and observed by a laser microscope (LEXTOLS 3000, manufactured by Olympus Corporation) and particle diameters of randomly selected 20 particles were measured to measure the average particle diameter of particles corresponding to silica a, b, and c described in Examples. The length was measured in the direction in which the maximum particle diameter of the respective particles was measured.

A base layer polyester resin was obtained in the following methods.

Synthesis Example of Polyester 1

Into an autoclave equipped with a stirrer, a thermometer, and a partially refluxing condenser and made of a stainless steel, introduced are dimethyl terephthalate (DMT) 100 mole % as a dicarboxylic acid component, and ethylene glycol (EG) 70 mole % and neopentyl glycol (NPG) 30 mol % as glycol components with 2.2 times (molar ratio) with respect to the methyl ester, and zinc acetate 0.05 mole % (with respect to the acid component) as a transesterification catalyst and antimony trioxide 0.025 mole % (with respect to the acid component), ester exchange reaction was conducted while distilling methanol generated out of the system. Thereafter polycondensation reaction was carried out at 280 ° C. under a reduced pressure of 26.7 Pa, a polyester (A) was obtained.

Synthesis Example of Polyester 2-3

In a same manner as in Synthesis example 1, polyesters B to C represented in Table 1 were synthesized. In the Table, NPG is neopentyl glycol, BD is 1,4-butanediol and DEG is diethylene glycol.

TABLE1

| | Polyester composition (mole %) | | | | |
| --- | --- | --- | --- | --- | --- |
| | Dicarboxylic acid component | Diol components | | | Silica amount |
| | DMT | EG | NPG | BD | (ppm) |
| A | 100 | 70 | 30 | — | — |
| B | 100 | 100 | — | — | — |
| C | 100 | — | — | 100 | — |
| D | 100 | — | — | 100 | 7000 |

Additionally, $SiO_2$ particles (amorphous, average particle diameter 2.4 μm) were used as an inorganic lubricant and a master batch (D) obtained by adding 0.7 wt. % of the lubricant to the polyester (A) was used. The addition method of the lubricant employed was a method of previously dispersing the lubricant in ethylene glycol and carrying out polymerization by the above-mentioned method.

Further, a water dispersion (E) of a copolymer polyester resin was obtained by the following method.
<Preparation of Hydrophobic Co-Polyester>

An autoclave equipped with a stirrer, a thermometer, and a partially refluxing condenser and made of a stainless steel was added with 345 parts of dimethyl terephthalate (DMT) as a dicarboxylic acid component, 211 parts of 1,4-butanediol (BD) and 270 parts of ethylene glycol (EG) as glycol components, and 0.5 parts of tetra-n-butyl titanate as a polymerization catalyst, and ester exchange reaction was carried out from 160° C. to 220° C. for 4 hours. Then, 14 parts of fumaric acid and 160 parts of adipic acid were added as dicarboxylic acid components thereto, and heated over 1 hour from 200° C. to 220° C. to carry out esterification reaction. Next, the reaction system was heated to 255° C. and the pressure was gradually decreased and thereafter, reaction was carried out in a reduced pressure of 0.22 mmHg for 1 hour and 30 minutes to obtain a hydrophobic co-polyester. The obtained hydrophobic co-polyester was light yellow and transparent and had a weight average molecular weight of 20000.
<Grafting of Radical Polymerizable Monomer>

A reactor equipped with a stirrer, a thermometer, a refluxing device, and a quantitatively dripping device was added with 75 parts of the above-mentioned hydrophobic co-polyester, 56 parts of methyl ethyl ketone, and 19 parts of isopropyl alcohol and heated to 65° C. with stirring to dissolve the hydrophobic co-polyester. After the hydrophobic co-polyester was completely dissolved, 15 parts of maleic anhydride (MA) as a radical polymerizable monomer was added to the polyester solution. Next, a solution obtained by dissolving 10 parts of styrene (ST) as a radical polymerizable monomer and 1.5 parts of azobisdimethylvaleronitrile as a graft polymerization initiator in 12 parts of methyl ethyl ketone was dropwise added at a speed of 0.1 ml/min to the polyester solution and the contents were stirred further for 2 hours. After the reaction solution was sampled for analysis, 5 parts of methanol was added. Then, 300 parts of water and 15 parts of triethylamine were added to the reaction solution and stirred for 1 hour. Thereafter, the inner temperature of the reactor was increased to 100° C. to remove methyl ethyl ketone, isopropyl alcohol, and excess triethylamine by distillation to obtain a water-based dispersion (E) of a polyester graft copolymer with a solid content of 25%. The polyester graft copolymer was light yellow and transparent and had a glass transition temperature of –10° C.

Further, a water dispersion (F) of a co-polyester resin was obtained by the following method.

A coating solution to be used for the invention was prepared by the following method. A reaction container was charged with 95 parts by weight of dimethyl terephthalate, 95 parts by weight of dimethyl isophthalate, 35 parts by weight of ethylene glycol, 145 parts by weight of neopentyl glycol, 0.1 parts by weight of zinc acetate, and 0.1 parts by weight of antimony trioxide and ester exchange reaction was carried out at 180° C. for 3 hours. Next, 6.0 parts by weight of 5-sodiumsulfoisophthalic acid was added, esterification reaction was carried out at 240° C. for 1 hour, and thereafter condensation polymerization was carried out at 250° C. for 2 hours in a reduced pressure (0.2 to 10 mm Hg) to obtain a co-polyester resin with a number average molecular weight of 19,500.

After 300 parts by weight of the obtained co-polyester resin and 140 parts by weight of butyl cellosolve were stirred at 160° C. for 3 hours to obtain a viscous melted solution and water was gradually added to the melted solution to obtain an water dispersion (F) of the co-polyester resin with a homogeneous light white color and a solid content concentration of 30% after 1 hour.

Example 1

(1) Polyester Resin and Undrawn Film

A polyester composition obtained by mixing 75 wt. % of polyester A, 10 wt. % of B, and 10 wt. % of C shown in Table 1, which had been separately predried, were separately supplied continuously by a quantitative screw feeder into a hopper immediately above an extruder, and blending therein. The mixture was melt extruded at 275° C. by a monoaxial extruder, and then rapidly cooled on a chill roll with a surface temperature of 25° C. to obtain an undrawn film having a thickness of 200 μm.

(2) Preparation of Coating Solution

A coating solution was prepared by mixing water at a ratio of 29.8% of the total, isopropyl alcohol at a ratio of 30% of the total, the water dispersion (E) of the co-polyester resin with (a) colloidal silica ("Snowtex MP 2040", manufactured by Nissan Chemical Industries Co., Ltd.) at a ratio of 15% to the solid content and (b) colloidal silica ("Snowtex OS", manufactured by Nissan Chemical Industries Co., Ltd.) at a ratio of 10% to the solid content, adding a solution adjusted to contain dodecyl sulfonate at a solid content concentration of 30% in an amount of 10% of the total, and blending the mixture.

(3) Production of Coated Film

While being coated with the coating solution prepared in (2) in a bar coating manner, the undrawn film obtained in (1) was continuously led to a tenter and preliminarily heated until the film temperature became 98° C. and thereafter drawn 5.0 times in the transverse direction at a temperature of 77° C. Next, heating treatment was carried out at 78° C. for 14 seconds to obtain a heat shrinkable polyester film with a coating amount of 0.01 g/m² and a thickness of 40 μm. The properties of the obtained film are shown in Table 2.

Example 2

A heat shrinkable polyester film was obtained in the same manner as in Example 1, except that the colloidal silica (b) was adjusted to be 10% to the solid content and (c) colloidal silica ("Snowtex MP 3040", manufactured by Nissan Chemical Industries Co., Ltd.) was added at a ratio of 15% to the solid content.

The properties of the obtained film are shown in Table 2.

Example 3

A heat shrinkable polyester film was obtained in the same manner as in Example 1, except that the water dispersion (F) of the polyester resin was mixed with (d) silica ("Sylysia 310, manufactured by Fuji Silysia Chemical Ltd.) at a ratio of 0.6% to the solid content and (e) colloidal silica ("Snowtex OL", manufactured by Nissan Chemical Industries Co., Ltd.) at a ratio of 10% to the solid content, dodecyl sulfonate was added at a ratio of 2.5% to the solid content, a water dispersion of 30 wt. % of IPA was adjusted to obtain a coating solution, and the coating amount was adjusted to be 0.05 g/m² by a reverse coating manner.

The properties of the obtained film are shown in Table 2.

Comparative Example 1

A sample was produced in the same procedure as in Example 1, except that a polyester composition obtained by mixing 75 wt. % of polyester A, 10 wt. % of B, 9 wt. % of C, and 6 wt. % of D shown in Table 1, which had been separately predried, was melt extruded to obtain a base layer and no coating was carried out, and the sample was evaluated. The properties of the obtained film are shown in Table 2.

Comparative Example 2

A sample was produced in the same procedure as in Example 1, except that no coating was formed, and evaluated. The properties of the obtained film are shown in Table 2.

However, when the sample was to be rolled like a roll with a paper tube, wrinkles were formed in the sample due to a deficient slipping property and further blocking of films to each other occurred.

Comparative Example 3

A sample was produced in the same procedure as in Example 1, except that the addition amounts of colloidal silica were changed, and evaluated. The properties of the obtained film are shown in Table 2.

The obtained film was insufficient in the slipping property and unsuitable for practical use.

Comparative Example 4

A sample was produced in the same procedure as in Example 1, except that an adjusted solution with 40% of a dodecyl sulfonate solid content was used, and evaluated. The properties of the obtained film are shown in Table 2. Particle diameter enlargement due to agglomeration was observed in the particles in the obtained film surface layer, a portion of particles were dropped, and the film was insufficient in the slipping property and unsuitable for practical use.

TABLE 2

| | Base layer Amount of Silica (ppm) | Surface layer | | | | | | | Average particle diameter of particles in coating layer (μm) |
|---|---|---|---|---|---|---|---|---|---|
| | | Main component | Content of inorganic particles (in the layer: wt %) | | | | | Thickness of surface layer (μm) | Solid content of surface layer (g/m²) | |
| | | | a | b | c | d | e | | | |
| Example 1 | 0 | Polyester copolymer | 15 | 10 | — | — | — | 0.01 | 0.01 | 0.2 |
| Example 2 | 0 | Polyester copolymer | — | 10 | 15 | — | — | 0.01 | 0.01 | 0.3 |
| Example 3 | 0 | Polyester copolymer | — | — | — | 0.6 | 10 | 0.05 | 0.05 | 2.4 |
| Comparative Example 1 | 420 | — | — | — | — | — | — | — | — | — |
| Comparative Example 2 | 0 | — | — | — | — | — | — | — | — | — |
| Comparative Example 3 | 0 | Polyester copolymer | 0.1 | — | — | — | — | 0.01 | 0.01 | 0.2 |
| Comparative Example 4 | 0 | Polyester copolymer | 15 | — | — | — | — | 0.01 | 0.01 | 5 |

TABLE 2-continued

| | Haze (%) | | 45° gloss | | | | Dynamic friction coefficient µd | Surface resistivity logΩ | Solvent adhesion strength (N/mm) | Hot water shrinkage ratio (%) |
| | | | Non-treatment | | After 10% shrinkage | | | | | |
| | Non-treatment | After 10% shrinkage | Side A | Side B | Side A | Side B | Side A/ Side B | Side A | Side A/ Side B | Main shrinkage direction |
|---|---|---|---|---|---|---|---|---|---|---|
| Example 1 | 0.4 | 0.5 | 216 | 215 | 214 | 213 | 0.51 | 10.5 | 4.8 | 75 |
| Example 2 | 0.4 | 0.6 | 217 | 216 | 215 | 213 | 0.48 | 10.6 | 4.8 | 75 |
| Example 3 | 0.3 | 0.4 | 209 | 208 | 205 | 206 | 0.45 | 11.1 | 4.9 | 74 |
| Comparative Example 1 | 8.8 | 8.6 | 186 | 187 | 185 | 185 | 0.42 | 16.0 | 5.0 | 75 |
| Comparative Example 2 | 0.3 | 0.3 | 222 | 221 | 220 | 220 | Exceed 2 | 16.0 | 5.2 | 75 |
| Comparative Example 3 | 0.2 | 0.2 | 220 | 221 | 218 | 220 | 1.66 | 10.5 | 5.0 | 74 |
| Comparative Example 4 | 0.2 | 0.2 | 220 | 221 | 218 | 220 | 1.78 | 10.5 | 5.0 | 74 |

INDUSTRIAL APPLICABILITY

The heat shrinkable polyester film of the invention is excellent in transparency, gloss and productivity, has a smooth slipping property necessary for handling, antistatic property, and excellent processability, and is suitable for uses for labels and thus highly valuable for uses.

The invention claimed is:

1. A heat shrinkable polyester laminated film comprising (a) a base film of a polyester resin and (b) a surface layer formed on at least one face of the base film, wherein the surface layer contains (i) colloidal silica with a particle diameter of 1 nm or more and 300 nm or less and (ii) 0.001 to 0.5 g/m² of an anionic antistatic agent containing an alkyl group having 10 to 20 carbon atoms, and wherein the heat shrinkable polyester film has a haze value of 2% or less, a glossiness of 200% or more at a measurement angle of 45° for at least one face, a dynamic friction coefficient between one face and the other face of 1.5 or less, a shrinkage ratio of 50% or more in the main shrinkage direction when the film is immersed in hot water at 95° C. for 10 seconds, and a surface resistivity of 13 log Ω or less at a relative humidity of 65%.

2. The heat shrinkable polyester film according to claim 1, wherein a haze value is 3% or less and a glossiness is 190% or more at a measurement angle of 45° for at least one face of the film after the film is shrunk by 10% in the main shrinkage direction by immersing the film in hot water at 90° C. for 10 seconds.

3. The heat shrinkable polyester film according to claim 1 having a solvent adhesion strength of 2 N/15 mm or more.

4. The heat shrinkable polyester film according to claim 1, wherein the surface layer has a solid content amount in a range of 0.0005 g/m² or more and 0.1 g/m² or less.

5. The heat shrinkable polyester film according to claim 1, wherein the surface layer contains a polyester and/or a polyester derivative.

\* \* \* \* \*